July 18, 1933.  A. T. NABSTEDT  1,918,775
REVERSE GEAR
Filed Feb. 3, 1931   2 Sheets-Sheet 1

Inventor
Arthur T. Nabstedt
By Rockwell ny Bartholow
Attorneys

July 18, 1933.    A. T. NABSTEDT    1,918,775
REVERSE GEAR
Filed Feb. 3, 1931    2 Sheets-Sheet 2
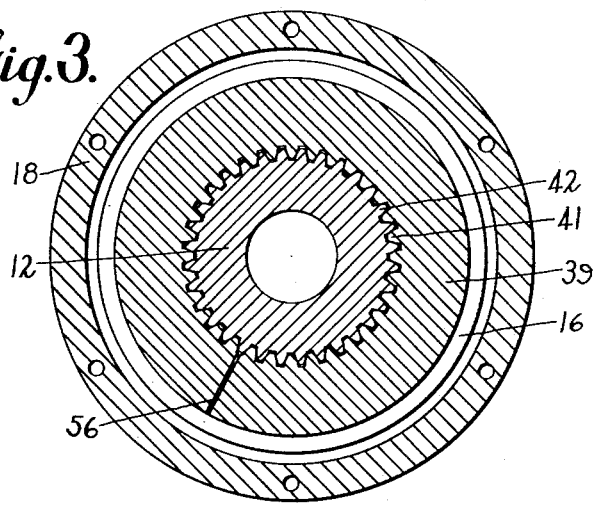
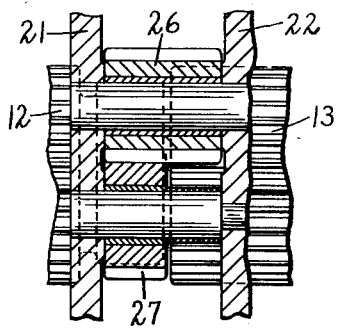
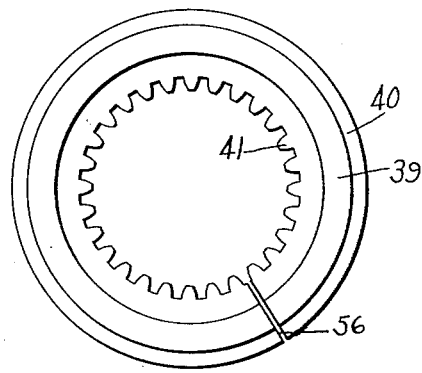
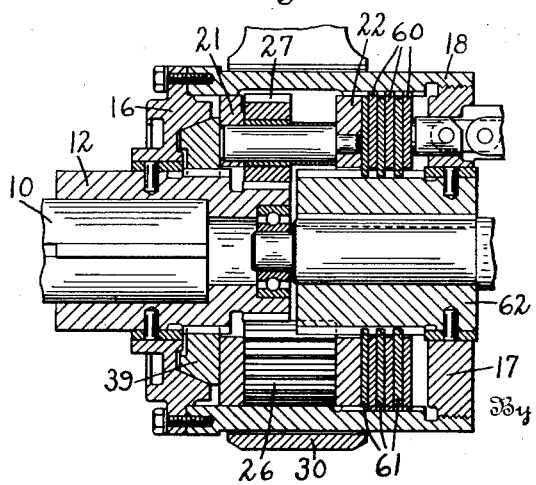

Patented July 18, 1933

1,918,775

UNITED STATES PATENT OFFICE

ARTHUR T. NABSTEDT, OF HAMDEN, CONNECTICUT, ASSIGNOR TO THE SNOW & PETRELLI MANUFACTURING COMPANY, OF NEW HAVEN, CONNECTICUT

REVERSE GEAR

Application filed February 3, 1931. Serial No. 513,111.

This invention relates to power transmission gears and more particularly to such gearing of the type generally used in marine engines and known as reverse gears. In this type of gearing it is desirable that the mechanism efficiently transmit power from the engine shaft to the propeller shaft smoothly and without vibration.

One of the objects of this invention is to provide an improved transmission gear of the above type which will be economical to manufacture and efficient in use.

Another object is to provide an improved reverse gear by the use of which cyclic variations developed in the crankshaft of the engine will be cushioned and will not result in noises in the reverse gear.

Still another object of the invention is to provide in a reverse gear an improved clutch member which will diminish vibratory noises and will act in the capacity of an auxiliary flywheel.

Another object is to provide in a reverse gear an improved clutch member which, while slidably mounted, will upon engagement hold the mass of the gear structure tightly to the driving member both concentrically and axially.

A further object is to provide an improved clutch member for use in reverse gears or like mechanisms, which by rigidly connecting rotary parts together, eliminates backlash and the consequent objectionable vibratory noises.

To these and other ends, the invention consists in the novel features and combinations of parts to be hereinafter described and claimed.

In the accompanying drawings:

Fig. 3 is a section on line 3—3 of Fig. 1;

Fig. 4 is a section on line 4—4 of Fig. 2;

Fig. 5 is a detail view of a clutch member, and

Fig. 6 is a slightly modified form of reverse gear embodying the features of this invention.

Figure 1:
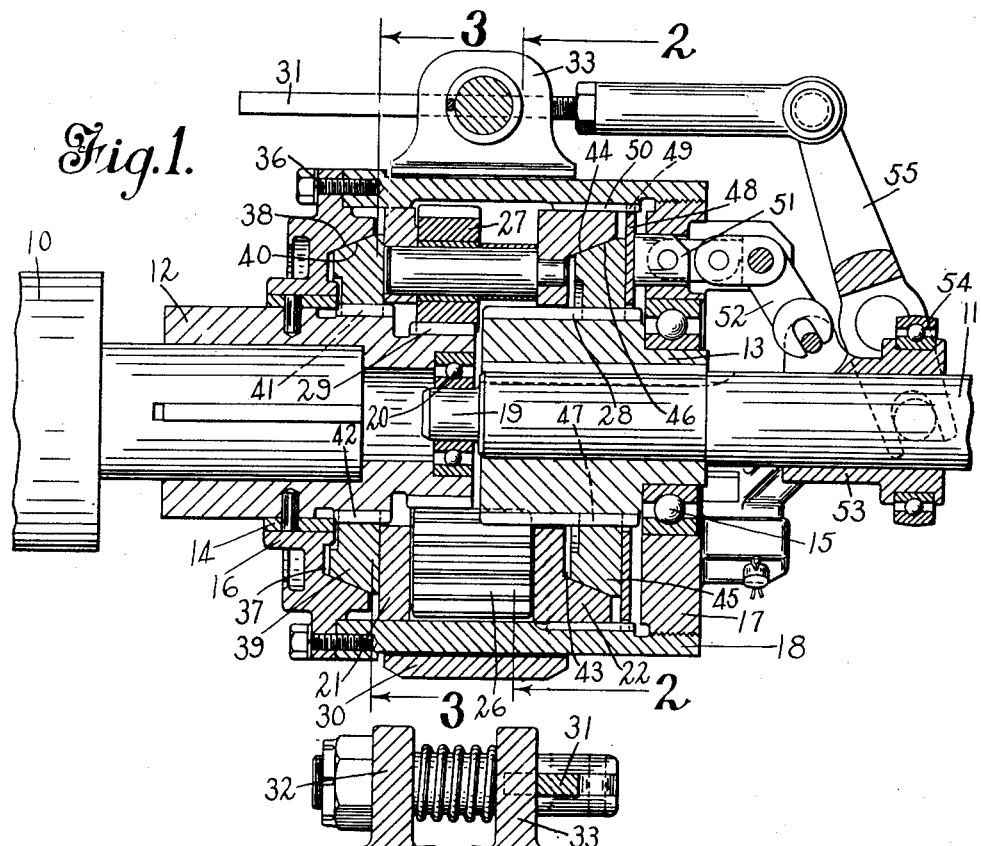
Fig. 1 is a longitudinal section through a reverse gear embodying the features of this invention.
Figure 2:
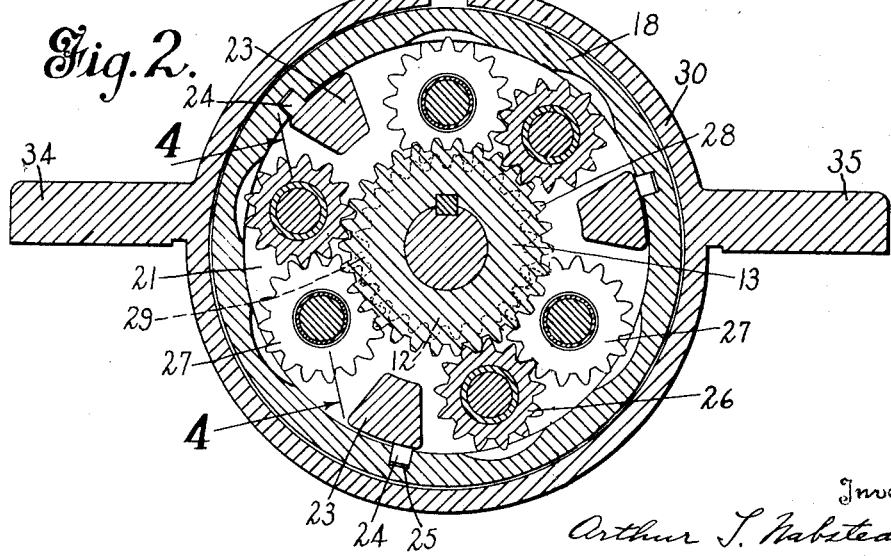
Fig. 2 is a transverse section on lines 2—2 of Fig. 1.

The transmission gear illustrated in the drawings is of the type generally known as reverse gears and is especially adapted for use with marine engines, being disposed between an engine shaft 10 and a propeller shaft 11 to rotatably connect the same for either forward or reverse operation of the propeller shaft. The ends of the respective shafts are keyed to sleeve gears 12 and 13 respectively that are mounted in bearings 14 and 15 respectively. The bearings 14 and 15 are disposed between the sleeve gears 12 and 13, and end plates 16 and 17 respectively, that are secured to the opposite ends of a cylindrical casing 18 and form the end walls thereof. Due to this arrangement, relative rotation is permitted between casing 18 and sleeve gears 12 and 13. The end 19 of shaft 11 is journaled in a bearing 20 disposed in the inner end of sleeve gear 12.

A pinion cage, comprising spaced apart side plates 21 and 22 connected together by a plurality of cross-bars 23, is disposed within the casing 18. The side plates 21 and 22 are connected to casing 18 against relative rotation thereof while permitting relative axial movement therebetween by means of lugs 24 that extend from bars 23 into grooves 25, formed in the casing wall. Rotatably mounted between plates 21 and 22, upon suitable shafts, are sets of pinions each comprising meshed pinions 26 and 27. The teeth of pinion 26 of each set are in mesh with teeth 28 formed on sleeve gear 13, and the teeth of pinion 27 of each set are in mesh with teeth 29 formed on sleeve gear 12. The arrangement is such that when casing 18 is retained against rotation by means of a brake band 30 provided for this purpose, rotation of engine shaft 10 rotates pinions 27, which rotate pinions 26 and thereby causes rotation of propeller shaft 11 in a direction opposite to the direction of rotation of shaft 10 and at predetermined speed.

The brake band 30 is arranged around casing 18 and may be tightened about the same by shifting a cam bar 31 to draw the ends 32 and 33 of the band together. Rotation of band 30 is prevented by holding the same relatively to a stationary part of any suitable gear supporting means by arms 34 and 35, that extend outwardly from opposite sides of the band 30.

The casing end 16 is secured to one end of casing 18 by screws 36 and is provided upon its inner face with a recess 37, the inner peripheral wall of which has a conical friction surface 38 formed thereon. The end plate 16, by means of the conical surface 38, forms part of a clutch between sleeve gear 12 and casing 18 by its cooperation with a clutch ring 39 that is provided with a conical friction surface 40 upon its outer periphery, that fits the conical friction surface 38 of plate 16. The ring 39 is also provided with teeth 41 formed upon its inner periphery, that mesh with teeth 42, formed on sleeve gear 12. The ring 39 is axially slidable on sleeve gear 12 into and out of frictional engagement with plate 16 at the cooperating conical surfaces thereof. The clutch ring 39 is engaged by side plate 21 of the pinion cage and axial movement of the latter toward end plate 16 will cause engagement of the cooperating conical surfaces 38 and 40, whereby engine shaft 10, through sleeve gear 12, will be drivingly connected to casing 18.

The pinion cage side plate 22 is provided with a recess 43 formed in its outer end surface, the inner peripheral wall of which has a conical friction surface 44 formed thereon. Side plate 22, by virtue of the conical surface 44, forms part of a clutch between the sleeve gear 13 and casing 18 by its cooperation with a clutch ring 45 that is similar in all respects to clutch ring 39, having a conical friction surface 46 upon its outer periphery that fits against surface 44 of plate 22 and teeth 47 formed upon its inner periphery that mesh with teeth 28 of sleeve gear 13. Clutch ring 45 is axially slidable on sleeve gear 13 into and out of frictional engagement with plate 22 at the cooperating conical surfaces thereof.

The clutch ring 45 when in frictional engagement with plate 22, drivingly connects the casing 18 with the propeller shaft 11, through sleeve gear 13. Clutch ring 45 is axially engaged by a disk 48, that is axially slidable within casing 18, being secured thereto against relative rotation by means of cooperating teeth 49 and 50, formed respectively on the periphery of disk 48 and the internal surface of casing 18.

The disk 48 may be pressed into engagement with clutch ring 45 by plungers 51 that are slidably mounted in end plate 17 and are movable therethrough by means of suitable levers 52, an operating sleeve 53 slidably mounted on shaft 11, and a gear shift lever (not shown) which is connected to shift collar 54, mounted on sleeve 53. The amount of movement of the plungers 51 may be regulated by adjustment of end plate 17 axially, plate 17 being inserted in an end of casing 18 and retained therein by cooperating threads therebetween, whereby relative rotation will axially adjust one in respect to the other.

The arrangement of levers 52, sleeve 53 and cam bar 31 is such that by shifting the sleeve 53 in one direction the plungers 51 are pressed against disk 48, and cam bar 31 through a lever 55 is moved to permit the release of brake band 30 to free casing 18 from the braking action thereof. Pressure on disk 48 forces clutch ring 45 into recess 43 of side plate 22 and slides the pinion cage axially to cause side plate 21 to press against clutch ring 39 that in turn is forced into recess 37 of end plate 16. Or the same pressure may cause casing 18 to move axially and cause the part having the recess 37 to engage the ring 39. This action securely connects casing 18 with both sleeve gears 12 and 13, one through plate 16 and the other through pinion cage side plate 22. The shafts 10 and 11 are thus directly connected together for rotation in the same direction and at the same speed, the entire reverse gear with the exception of brake band 30, cam bar 31 and lever 55 rotating therewith.

Reverse gears of the general type above described have been in use heretofore but in such gears and particularly those of the kind known as double clutch gears the clutches have usually comprised in the structure of each a plurality of interengaging disk members arranged in groups, one group secured to a driving member and the other group to a driven member. Clutches of the disk type have, however, been somewhat objectionable in reverse gears on account of the creation of objectionable vibratory noises, especially where the engine develops considerable crank shaft vibration. In the present instance, the disk clutches are replaced by cone clutches as above described, one of these cone clutches having one member formed as a part of the forward end plate of the gear case and the other member as an element (39) interposed between said plate and the pinion cage, whereas the other cone clutch has a member formed on the rear end of the pinion cage and another member (45) interposed between the rear end of the gear cage and the rear end plate of the casing.

The clutch rings 39 and 45 are each split by a radial cut 56 which extends through the same from the outer periphery to the inner periphery thereof, as shown in Fig. 5, whereby they are made slightly resilient and are radially expansible and contractible within certain limits and therefore compress when forced into the respective recesses 37 and 43. This increases the frictional engagement between the cooperating conical surfaces but more particularly it tightens the engagement between the cooperating teeth of the rings and the respective sleeve gears. A particularly tight and rigid connection is therefore produced and vibrations due to angular slack or looseness of the connecting parts are eliminated. The elimination of such vibrations obviously prevents all vibratory noises and the reverse gear operates substantially noiselessly. By such structure, vibrations set up in the engine shaft 10 by uneven engine operation have been found to be reduced and not intensified in the reverse gear and such vibrations are, therefore, not noticeable.

The modified form of reverse gear shown in Fig. 6, with the exception that only one clutch ring is provided, is identical to the preferred form previously described. In this instance, in place of clutch ring 45 and the associated parts therefor, a series of clutch disks 60 and 61 are provided, the disks 60 of which are secured against relative rotation to casing 18 and disks 61 are secured against relative rotation to sleeve gear 62. In this case, as before, a cone clutch is used at the forward end of the reverse gear, being interposed between the forward end plate of the gear case and the forward end of the pinion cage, and this clutch has a member movable along a sleeve gear and automatically tightened thereon as the clutch surfaces are interengaged.

While I have shown and described a preferred form of my invention, it will be understood that it is not to be limited to the details shown but is capable of modification and variation within the spirit of the invention and the scope of the appended claims.

What I claim is:

1. In a reverse gear, a casing, a gear within said casing, means to connect said casing and said gear together including a part connected to said casing, and a part having an opening in which said gear is disposed and connected thereto, one of said parts having a recess, the other of said parts being movable axially with respect to the firt part to clutchingly engage the first part within the recess thereof and being in the form of a compressible split ring.

2. In a reverse gear, a casing, a gear within said casing, and means to drivingly connect said casing with said gear comprising a part secured to said casing, and a split ring-shaped member drivingly connected to and encircling said gear, said part and said ring-shaped member being axially movable relative to each other and having cooperating friction engaging surfaces that engage when said parts are moved axially toward each other and compress said split ring member.

3. In a reverse gear, a casing, a shaft extending into said casing, a sleeve gear secured to said shaft, and means to drivingly connect said casing with said sleeve gear comprising a part secured to said casing, a split ring-shaped member drivingly connected to said sleeve gear and axially slidable in respect thereto, said part and said split ring-shaped member having cooperating friction engaging surfaces and means to slide said ring-shaped member to engage said cooperating friction-engaging surfaces and compress said split ring member.

4. In a reverse gear, a casing, a shaft extending into said casing, a sleeve gear secured to said shaft, and means to drivingly connect said casing with said sleeve gear comprising a part secured to said casing and a split ring-shaped member, said split ring-shaped member and said sleeve gear having cooperating teeth therebetween and arranged whereby one is axially slidable relatively to the other, said part and said split ring-shaped member having cooperating friction engaging surfaces and means to slide said ring-shaped member to engage said cooperating friction-engaging surfaces and to compress said split ring member.

5. In a reverse gear, a casing, a driving gear, a driven gear, means to drivingly connect said gears including a split ring member mounted for axial movement upon one of said gears and to be radially compressed to clutchingly engage said casing when axially moved in one direction, means to connect said casing to the other of said gears, and means to axially move said ring member.

6. In a reverse gear, a casing, a driving gear, a driven gear, means to drivingly connect said gears for reverse rotation of one in respect to the other, and means to drivingly connect said gears for direct rotation of one from the other, including a split ring member mounted for axial movement upon one of said gears and to be radially compressed to clutchingly engage said casing when axially moved in one direction, means to connect said casing to the other of said gears, and means to axially move said ring member.

7. In a reverse gear, a casing, a driving gear, a driven gear, means to drivingly connect said gears including a split ring member mounted for axial movement upon each of said gears, one of said ring members clutchingly engaging an end plate of said casing and the other clutchingly engaging a part within said casing and connected thereto.

8. In a reverse gear or the like, aligned driving and driven shafts, a rotatable casing, a pinion cage within and secured to said casing to rotate therewith, pinions rotatably mounted in said cage and rotatably connecting said shafts, a clutch to clutch one of said shafts to said casing, said clutch including a split ring having a friction surface to frictonally engage said casing and be compressed thereby and being connected to said shaft, said ring being mounted for axial movement with respect to said casing, and means to move said ring axially into engagement with said casing.

9. In a reverse gear or the like, aligned driving and driven shafts, a rotatable casing, a pinion cage within and secured to said casing to rotate therewith, pinions rotatably mounted in said cage and rotatably connecting said shafts, a clutch to clutch each of said shafts to said casing, each of said clutches including a split ring connected to each shaft and each having a friction surface, one of said rings frictionally engaging said casing to be compressed thereby and the other of said rings frictionally engaging said cage to be compressed thereby, both of said rings being mounted for axial movement with respect to said casing and cage, and means to move said rings axially into engagement, one with said casing and one with said cage.

10. In a reverse gear or the like, aligned driving and driven shafts, a rotatable casing, a pinion cage within and secured to said casing to rotate therewith, pinions rotatably mounted in said cage and rotatably connecting said shafts, said cage being slidable axially with respect to said shafts, and a clutch to clutch each of said shafts to said casing, each of said clutches including a split ring connected to each shaft and being axially slidable in respect thereto, each of said rings having a friction surface and means to pressingly engage one of said rings to move its friction surface into frictional engagement with said cage and to move said cage against the other of said rings to press its frictional surface into frictional engagement with said casing.

11. In a reverse gear, the combination of a shaft, a sleeve gear secured thereto, a radially contractible clutch member having internal teeth engaging the teeth of said gear and slidable along the latter, a second clutch member to be engaged by the first, and means to radially contract said first-mentioned clutch member and thereby tighten the engagement between the teeth of said sleeve gear and those of said first clutch member when said first clutch member is moved into clutching engagement with said second clutch member.

12. In a reverse gear, the combination of a shaft, a sleeve gear secured thereto, a radially contractible clutch member having internal teeth engaging the teeth of said gear and slidable along the latter, a second clutch member to be engaged by the first, and means to radially contract said first-mentioned clutch member and thereby tighten the engagement between the teeth of said sleeve gear and those of said first clutch member when said first clutch member is moved into clutching engagement with said second clutch member, said means including cooperating conical engaging surfaces on said clutch members.

13. In a reverse gear, a shaft, a case, a sleeve gear on the shaft, and a cone clutch structure for interlocking the case and shaft including in its structure a member movable along said sleeve gear and being adapted to be radially compressed and thereby automatically tightened about said sleeve gear as the cone clutch surfaces are interengaged.

14. In a reverse gear, a casing, an axially slidable pinion cage disposed within said casing, pinions rotatably supported by said cage, a shaft extending into each end of said casing, said shafts being drivingly connected to different pinions within said casing, and clutches for connecting said shafts one to said casing and one to said cage, one of said clutches comprising a cone clutch member on said casing and a cooperating cone clutch member connected with one of said shafts.

15. In a reverse gear, a casing having an end wall, an axially slidable pinion cage having a side plate disposed within said casing, pinions rotatably supported by said cage, a shaft extending into each end of said casing, a sleeve gear on each shaft, said sleeve gears being drivingly connected to different pinions within said casing, and clutches for connecting said sleeve gears one to said casing end wall and one to said cage side plate, one of said clutches comprising a cone clutch member on said casing end wall, and a cooperating cone clutch member connected with one of said sleeve gears.

16. In a reverse gear, a casing having an end wall, an axially slidable pinion cage having a side plate disposed within said casing, pinions rotatably supported by said cage, a shaft extending into each end of said casing, said shafts being drivingly connected to different pinions within said casing, the end wall of said casing and the side plate of said cage each having a member of a cone clutch thereon and a cone clutch member connected to each shaft and engageable one with the clutch member on the end wall of said casing and one with the clutch member on the side plate of said cage.

17. In a reverse gear, a casing, a shaft extending into said casing, a gear secured to said shaft, and means to drivingly connect said casing with said gear comprising a part secured to said casing and a split-ring-shaped member, said split ring-shaped member and said gear having cooperating teeth therebetween whereby one is drivingly connected to the other, said part and said split ring-shaped member having cooperating friction engaging surfaces.

18. In a reverse gear, the combination of a shaft, a gear secured thereto, a cone clutch member having internal teeth engaging the teeth of said gear, a second cone clutch member to be engaged by the first, a casing supporting said second clutch member, said first mentioned clutch member being adapted to increasingly tighten its engagement with the teeth of said gear when moved into clutching engagement with said second clutch member.

19. In a reverse gear, a shaft, a casing, a gear on said shaft and a cone clutch structure for interlocking said casing and said shaft, including a member automatically tightened on said gear as the cone clutch surfaces of said clutch structure are interengaged.

20. In a reverse gear, a casing, a shaft within said casing, a cylindrical member secured to said shaft, and means to drivingly connect said casing with said shaft comprising a clutch part secured to said casing, and a split ring-shaped part encircling said cylindrical member and cooperating with said clutch part to drivingly engage the same and to simultaneously grip said cylindrical member.

21. In a reverse gear, a shaft, another shaft, interconnected gearing between and connected to said shafts whereby one is driven by the other therethrough, and a cone clutch structure for connecting said shafts whereby one is directly driven by the other and not through said gearing, said clutch structure including a member connected to one shaft and another member movable axially along, and pressed into driving connection with, the other of said shafts as the clutch surfaces of said clutch structure are engaged.

22. In a reverse gear, a shaft, another shaft, interconnected gearing between and connected to said shafts whereby one is driven by the other therethrough, and a clutch structure for connecting said shafts whereby one is directly driven by the other and not through said gearing, one of the members of said clutch structure being compressible about one of said shafts, and means forming part of said clutch structure to compress said member into driving connection with said shaft when said clutch is in engaged position.

23. In a reverse gear, a shaft, another shaft, interconnected gearing between and connected to said shafts whereby one is driven by the other therethrough, a clutch structure for drivingly connecting said shafts whereby one is directly driven by the other and not through said gearing, said clutch structure including a radially compressible ring-shaped member, and means to engage and radially compress said ring-shaped member to connect said member to one of said shafts.

24. In a reverse gear, a casing, a shaft in said casing, another shaft in said casing, interconnected gearing between and connected to said shafts whereby one is driven by the other therethrough, a clutch structure for drivingly connecting said shafts whereby said shafts are drivingly connected together other than through said gears, said clutch structure including a radially compressible ring-shaped member having a surface adapted to engage part of said casing, said ring-shaped member being compressed when said surface is in engagement with said casing, and means to move said ring member into engagement with said casing.

25. In a reverse gear, a driving element, a driven element, interengaged gears between said elements and drivingly connecting the same, means to drivingly connect said elements other than through said gears, said means including a ring-shaped member split at one point in its circumference by a radial cut, and having a friction surface formed upon the outer periphery thereof, and means to cause the engagement of one of said elements with said friction surface to compress said ring-shaped member in a radial direction to reduce the diameter of its inner periphery.

26. In a reverse gear, a driving element, a driven element, interengaged gears between said elements and drivingly connecting the same, means to drivingly connect said elemets other than through said gears, said means including a ring-shaped member split at one point in its circumference by a radial cut, and having a friction surface formed upon the outer periphery thereof and teeth formed about its inner periphery, and means to cause the engagement of one of said elements with said friction surface to compress said ring-shaped member in a radial direction to reduce the diameter of its toothed inner periphery.

27. In a reverse gear, a driving element, a driven element, interengaged gears between said elements and drivingly connecting the same, means to drivingly connect said elements other than through said gears, said means including a ring-shaped member split at one point in its circumference by a radial cut, and being formed upon its inner periphery to engage one of said elements, and means to cause the engagement of the other of said elements with said ring-shaped member to compress the same to reduce the diameter of its inner periphery.

28. In a reverse gear, a driving element, a driven element, interengaged gears between said elements and drivingly connecting the same, means to drivingly connect said elements other than through said gears, said means including a ring-shaped member split at one point in its circumference by a radial cut, and having a gripping surface formed upon its inner periphery to engage one of said elements, and means to compress said ring-shaped member to reduce the diameter of its inner periphery, said compressing means comprising cooperating and engaging surfaces between said ring-shaped member and the other of said elements.

29. In a reverse gear, a driving element, a driven element, interengaged gears between said elements and drivingly connecting the same, means to drivingly connect said elements other than through said gears, said means including a ring-shaped member split at one point in its circumference by a radial cut, and having a gripping surface formed upon its inner periphery to engage one of said elements, said other of said elements being adapted to engage the outer periphery of said ring-shaped member to compress the same in a radial direction to reduce the diameter of its inner periphery.

30. In a reverse gear, a shaft, another shaft, gearing in driving connection with said shafts, and means including a friction clutch for drivingly connecting said shafts, said clutch having a ring-shaped member provided with inner and outer peripheral surfaces and formed upon one of its peripheral surfaces to engage the other clutch member, said ring-shaped member being compressible and expansible to cause a change in its diameter when it is clutchingly engaged with such other member, said ring-shaped member being axially movable along one of said shafts and tightly connected thereto upon the change in diameter of said ring-shaped member when it is clutchingly engaged with the other clutch member.

ARTHUR T. NABSTEDT.